US010065528B2

(12) United States Patent
Dietrich

(10) Patent No.: US 10,065,528 B2
(45) Date of Patent: Sep. 4, 2018

(54) PANTOGRAPH CONFIGURATION FOR A VEHICLE AND VEHICLE WITH THE PANTOGRAPH CONFIGURATION

(71) Applicant: SIEMENS AKTIENGESELLSCHAFT, Munich (DE)

(72) Inventor: Klaus Dietrich, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 289 days.

(21) Appl. No.: 14/867,190

(22) Filed: Sep. 28, 2015

(65) Prior Publication Data

US 2016/0090008 A1 Mar. 31, 2016

(30) Foreign Application Priority Data

Sep. 26, 2014 (DE) .................. 10 2014 219 554

(51) Int. Cl.
*B60M 1/02* (2006.01)
*B60L 5/28* (2006.01)
*B60M 1/12* (2006.01)

(52) U.S. Cl.
CPC ............. *B60M 1/02* (2013.01); *B60L 5/28* (2013.01); *B60M 1/12* (2013.01)

(58) Field of Classification Search
CPC .. B60L 3/00; B60L 1/04; B60L 3/0023; B60L 5/00; B60L 9/00; B60L 1/16; B60L 3/04; B60L 5/24; B60L 5/28; B60M 1/02; B60M 1/12
See application file for complete search history.

(56) References Cited

U.S. PATENT DOCUMENTS

| 2,262,413 | A | * | 11/1941 | Whittaker | ................. B60L 5/32 191/8 |
| 9,022,153 | B2 | * | 5/2015 | Tojima | ...................... B60L 5/24 180/167 |
| 2002/0014383 | A1 | * | 2/2002 | Brooks | ..................... B60L 5/00 191/33 R |
| 2012/0000739 | A1 | * | 1/2012 | Nogi | ........................ B60M 3/04 191/50 |

FOREIGN PATENT DOCUMENTS

| EP | 2340958 A1 | 7/2011 |
| EP | 2296931 B1 | 4/2013 |
| JP | S4514335 Y1 | 6/1970 |
| JP | 59 11701 * | 1/1984 |
| JP | 2011166961 A | 8/2011 |
| WO | 2010003834 A1 | 1/2010 |

* cited by examiner

*Primary Examiner* — Mark T Le
(74) *Attorney, Agent, or Firm* — Laurence Greenberg; Werner Stemer; Ralph Locher

(57) ABSTRACT

A pantograph configuration for a vehicle has at least one pantograph embodied for at least temporary contact with an electrical network located externally outside the vehicle. The pantograph is movable from a contact position into a rest position. A first electrical network is located internally within the vehicle, which in the contact position is connected to the pantograph. A second electrical network located internally within the vehicle is connected to a ground or mass potential of the vehicle and in the rest position to the pantograph. In order to ensure that the pantograph is voltage-free in the rest position, the pantograph is connected to the first electrical network and the second electrical network in the rest position.

10 Claims, 3 Drawing Sheets

PANTOGRAPH CONFIGURATION FOR A VEHICLE AND VEHICLE WITH THE PANTOGRAPH CONFIGURATION

CROSS-REFERENCE TO RELATED APPLICATION

This application claims the priority, under 35 U.S.C. § 119, of German patent application DE 10 2014 219 554.3, filed Sep. 26, 2014; the prior application is herewith incorporated by reference in its entirety.

BACKGROUND OF THE INVENTION

Field of the Invention

The invention relates to a pantograph configuration for a vehicle, with at least one pantograph embodied for at least temporary contact with an electrical network located externally outside the vehicle, which is embodied to be movable from a contact position into a rest position, with a first electrical network located internally within the vehicle, which in the contact position is connected to the pantograph, and with a second electrical network located internally within the vehicle, which is connected to a ground or mass of the vehicle and in the rest position to the pantograph.

Pantograph configurations are known from the prior art and are employed for example on rail-borne vehicles in order to draw electrical energy from an energy network which is located externally outside the vehicle.

European Patent EP 2 296 931 B1 describes a pantograph configuration, which comprises an isolating device, in order safely to isolate the electrical connection to the external energy network and to ground the pantograph. The vehicles with known pantograph configurations can also comprise internal energy sources, for example an energy storage device or generator. As a result, even in their rest position, in which they are isolated from the energy network located externally outside the vehicle, the pantographs can be under voltage. The electrical connection between the pantograph and the energy source located internally within the vehicle is of course isolated by means of a contactor or a relay. In the defective state, however, these switching means can leave the pantograph under voltage, which gives rise to an unacceptable risk. Although the device described in the above-mentioned EP 2 296 931 B1 also ensures isolation from the internal network in the rest position, this is complex from the construction perspective, and thus cost-intensive.

SUMMARY OF THE INVENTION

It is accordingly an object of the invention to provide a pantograph assembly for a vehicle which overcomes the above-mentioned and other disadvantages of the heretofore-known devices and methods of this general type and which effects a voltage-free condition of the pantograph in the rest position and is embodied in a structurally simple manner.

With the foregoing and other objects in view there is provided, in accordance with the invention, a pantograph configuration for a vehicle, comprising:
at least one pantograph disposed externally outside the vehicle and configured to at least temporarily contact an electrical network, the at least one pantograph being movably mounted between a contact position and a rest position;
a first electrical network located internally within the vehicle and being connected to the pantograph in the contact position thereof; and
a second electrical network located internally within the vehicle and connected to ground potential of the vehicle and to the pantograph in the rest position thereof; and
wherein the pantograph, in the rest position thereof, is connected to the first electrical network and the second electrical network.

In other words, the objects are solved by the pantograph configuration wherein, in the rest position, the pantograph is connected to the first and the second electrical network.

The inventive solution has the advantage that by means of the connection of the first and second electrical network in the rest position a connection to the ground or mass of the vehicle is created in a very simple manner. An energy storage device located internally within the vehicle is for example connected to the first network located internally within the vehicle, so that in the rest position a short circuit between the energy storage device and the mass or ground of the vehicle would occur if a fuse fails and the connection is not severed. The danger that the pantograph is live in the rest position can be excluded.

The invention can be further developed by means of various advantageous embodiments, which are described below.

The pantograph can thus comprise at least one contact means and the second network located internally within the vehicle a mating contact means, which in the rest position are connected to each other and in the contact position are isolated from each other. This has the advantage that the connection between the first and the second electrical network can be created in a particularly simple manner. In particular, the contact means can be arranged on a section of the pantograph moving between the rest position and contact position, in order to make use of the movement of the pantograph which is anyway present to establish the connection of contact means and mating contact means. The electrical contact between the first and the second internal network is completed by the movement of the pantograph configuration into the rest position. A structurally complex embodiment or a separate drive for establishing the connection between contact means and mating contact means can hereby be dispensed with.

In order to be able clearly to identify the rest position of the pantograph, the pantograph configuration can comprise at least one switching means, wherein the switching means assumes a first switching state in the contact position of the pantograph and a second switching state in the rest position of the pantograph. The switching means can for example be a proximity switch, reed switch, limit switch or similar, which interrogates the rest position of the pantograph. The switching means can for example be coupled with an optical or acoustic signal via the controller located internally within the vehicle, which indicates the rest position of the pantograph. In the rest position work can be performed in the vicinity of the pantograph without danger.

In one advantageous development, the pantograph configuration can comprise at least one indicator means, wherein the indicator means assumes a first indication status in the rest position of the pantograph, which differs from an indication status outside the rest position. To this end the pantograph configuration can for example comprise a marker, which is visible from outside the vehicle and indicates attainment of the rest position and thus the safe status of the pantograph configuration. The pantograph can for example realize its lifting movement by means of a linear guide, upon which can be applied a readily visible marker, which indicates attainment of the rest position and which is in particular not discernible outside the rest position. The indicator means can in particular be visible from outside the vehicle.

The first network located internally within the vehicle can further be connected at least temporarily at least to an energy source located internally within the vehicle. This has the advantage that the vehicle can be driven independently of the position of the pantograph configuration.

In one advantageous embodiment the pantograph configuration can comprise at least two pantographs embodied for contact with electrical networks located externally outside the vehicle and which differ from each other, which in the rest position are electrically connected to each other. Vehicles with two pantographs are in particular employed in the case of non rail-borne vehicles, which must connect both poles via pantographs. In the case of rail-borne vehicles, generally only the contact of one pole is created via a pantograph, because the ground is created via the connection of the wheels with the rail. The embodiment has the advantage that in the rest position the pantographs are short-circuited with each other and both are connected to the mass of the vehicle. Safe working on the pantographs in the rest position is hereby guaranteed.

The invention further relates to a vehicle with a pantograph configuration according to one of the aforementioned embodiments.

In one advantageous embodiment the vehicle can be embodied as a non rail-borne vehicle. This has the advantage that in the case of non rail-borne vehicles, such as for example automobiles, the danger of a contact with the pantographs in the rest position, for example during charging and discharging, is particularly great and the inventive solution thereby results in a particular advantage.

The vehicle can further be embodied as a hybrid vehicle with at least two different energy converters. The vehicle can for example comprise a diesel engine and also an electric motor. A generator can be connected downstream of the diesel engine, which creates electrical energy to feed the electric motor. In the contact position the electric motor can also be driven via an energy network located externally outside the vehicle.

Other features which are considered as characteristic for the invention are set forth in the appended claims.

Although the invention is illustrated and described herein as embodied in a pantograph configuration for a vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
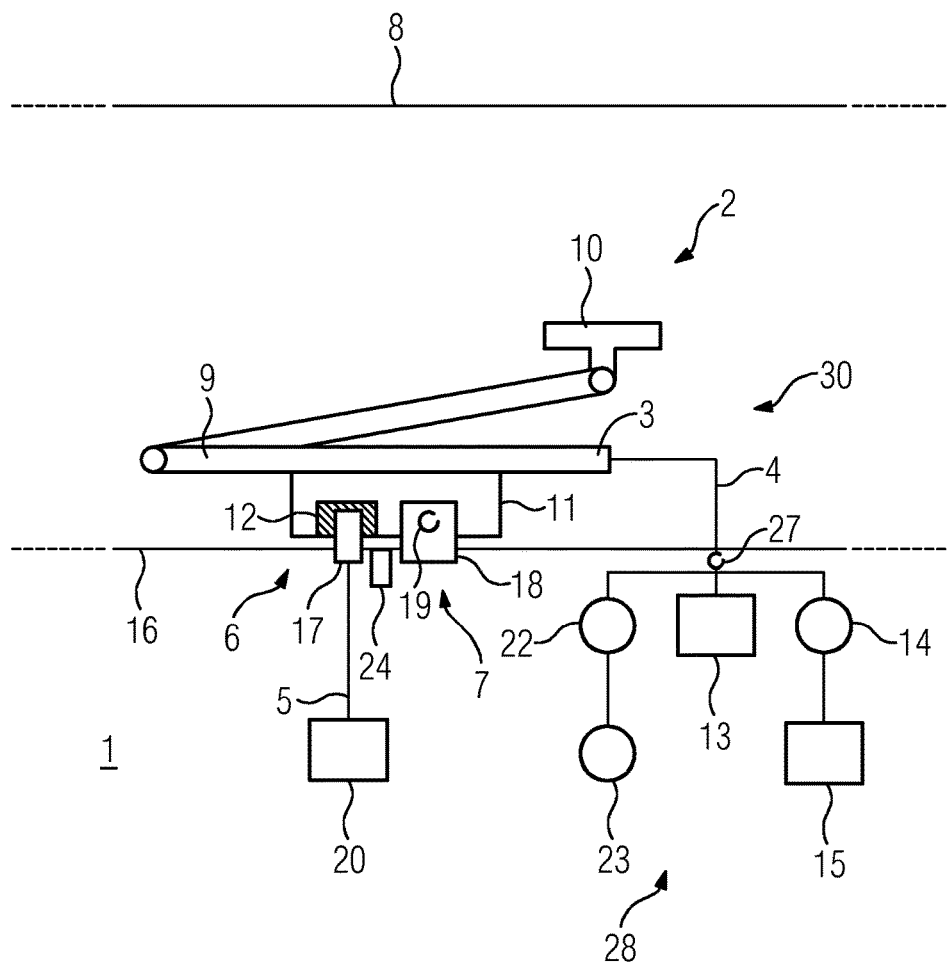
FIG. 1 shows a schematic representation of a first embodiment of a pantograph configuration according to the invention in a rest position.

Referring now to the figures of the drawing in detail and first, particularly, to FIG. 1 thereof, there is shown a part of a vehicle 1 with a novel pantograph configuration 2 according to the invention. The vehicle is for example a non rail-borne vehicle such as an automobile with hybrid drive, which can be driven both with electrical energy from an electrical network 8 located externally outside the vehicle and also with chemical energy from a fossil fuel, such as for example diesel or gasoline. The pantograph configuration comprises at least one pantograph 3, a first electrical network 4 located internally within the vehicle, a second network 5 located internally within the vehicle, a contact assembly 6 and a locking assembly 7.

The pantograph 3 is shown in schematic and partial form only and comprises a pantograph strut 9, a sliding contact 10, a locking tab 11 and a contact surface 12. The locking tab is connected to the pantograph strut 9 and fixed to it. The contact surface 12 is arranged on the locking tab 11 and electrically connected to the pantograph strut 9 and the sliding contact 10. The sliding contact 10 is furthermore electrically connected to the first network 4 located internally within the vehicle. The first network 4 located internally within the vehicle comprises an energy storage device 13 located internally within the vehicle, an electrical converter 14 and an electric motor 15. Energy storage device 13, converter 14 and electric motor 15 are part of the vehicle 1, on the roof 16 of which the pantograph configuration 2 is attached. In FIG. 1 the pantograph 3 is shown in a rest position, in which the sliding contact 10 is removed from the network 8 located externally outside the vehicle and lowered. The pantograph 3 of course comprises in a known manner a drive, by means of which it can be brought from the rest position into a contact position shown in FIG. 2 and fixing/stowage means (not shown) for attachment to the vehicle roof 16.

The contact assembly 6 comprises a mating contact 17 and the contact surface 12. The locking assembly 7 comprises the locking tab 11, a locking fork 18 and a locking bolt 19. The mating contact 17 is connected to the roof 16 of the vehicle 1 in a fixed manner, and part of the second network 5 located internally within the vehicle. The network 5 located internally within the vehicle is further connected to a ground potential, i.e., ground or mass 20 of the vehicle 1 or comprises these. The contact surface 12 is connected to the pantograph strut 9 in a fixed manner and thus embodied in a relatively movable manner relative to the mating contact, as the pantograph strut 9 is arranged in a movable manner in relation to the vehicle roof 16. The contact surface 12 is only one possible embodiment of a contact means. In a similar manner to the mating contact 17, the locking fork 18 too is attached to the roof 16 of the vehicle 1 in a fixed manner. The locking tab 11 is in turn connected to the pantograph strut 9 and is thus embodied to be movable relative to the vehicle roof 16. Locking fork 18 and locking tab 11 are embodied in a mutually complementary manner.

Figure 2:
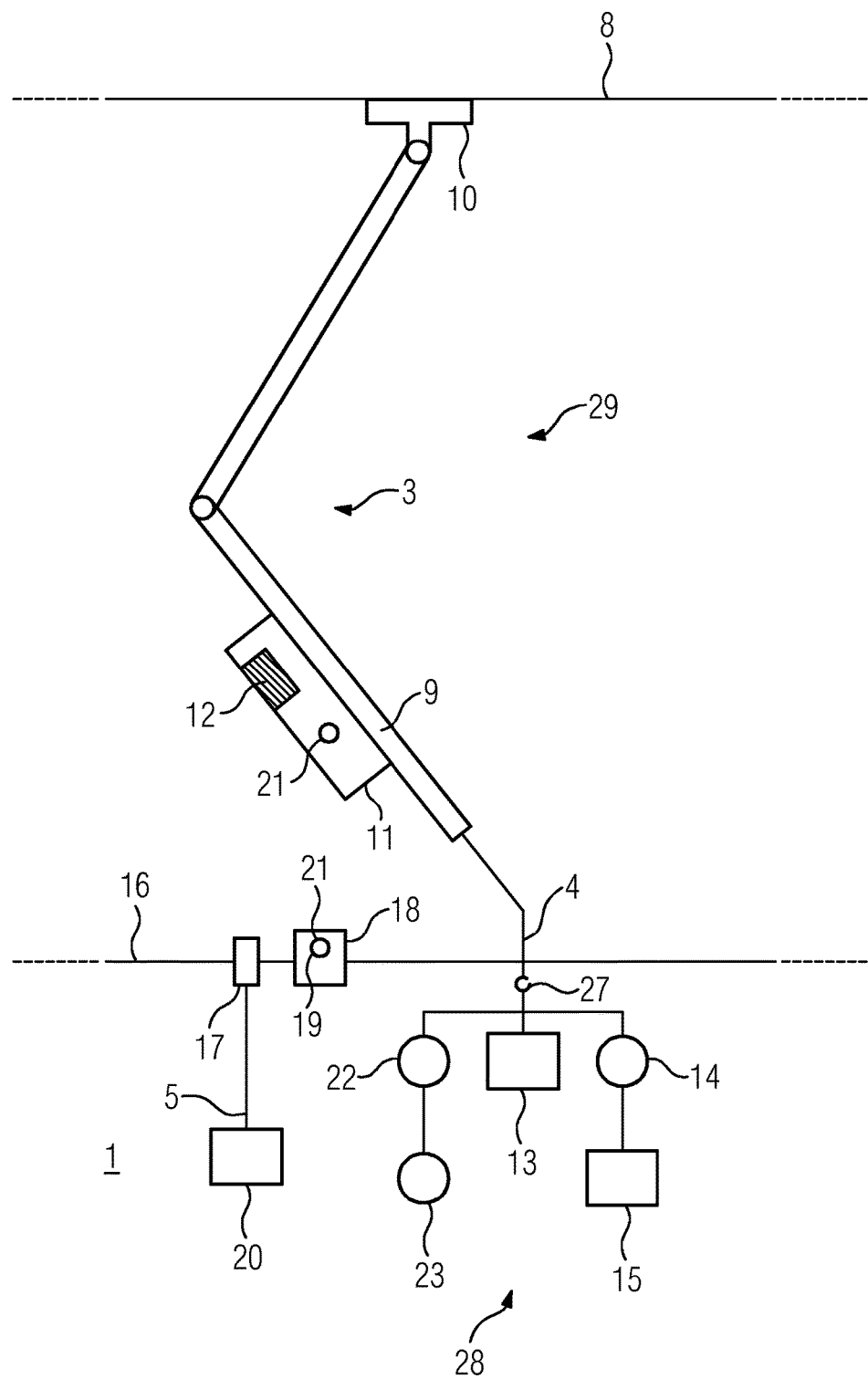
FIG. 2 shows the pantograph configuration from FIG. 1 in a contact position.

FIG. 2 shows the inventive pantograph configuration 2 from FIG. 1 in a contact position 29, in which the pantograph 3 is extended and the sliding contact 10 is in contact with the network 8 located externally outside the vehicle. The network 8 located externally outside the vehicle is for example a catenary above a route section. In the contact position 29 in FIG. 2 the contact surface 12 and the mating contact 17 of the contact assembly 6 are isolated from each other, so that no electrical connection exists between them. Likewise arranged to be isolated from each other are the locking tab 11 and the locking fork 18. The contact surface 12 is for example embodied as a blade contact and the mating contact 17 accordingly as a fork contact. In each case the contact surface 12 and mating contact 17 are embodied to be mutually complementary.

In the rest position 30 in FIG. 1, in which the pantograph 3 is lowered, the mating contact 17 and the contact surface 12 are in contact with each other, so that an electrical connection between them is created. An electrical connection between the pantograph 3 and the second network 5 located internally within the vehicle and thus to the ground/mass 20 is therefore created.

Furthermore the locking tab 11 is arranged in the locking fork 18. Embodied in the locking tab 11 is a through-hole 21, which in the rest position in FIG. 1 aligns with a through-hole 21 in the locking fork 18. Arranged in the aligned through-holes 21 in the rest position in FIG. 1 is a locking bolt 19, which secures the pantograph 3 in the rest position in a form-fitted manner.

There follows a description of the function of the inventive pantograph configuration 2 with reference to FIGS. 1 and 2.

In the contact position 29 in FIG. 2 an electrical connection between the pantograph 3 and the network 8 located externally outside the vehicle is created. As the pantograph 3 is connected to the first network 4 located internally within the vehicle, an electrical connection from the pantograph 3 to the energy storage device 13, the converter 14 and the electric motor 15 also exists. The electric motor 15 is connected to the drive wheels (not shown) of the vehicle 1, in order to propel the vehicle 1. In addition the first network 4 can comprise a switching means 27, such as for example a contactor, by means of which the pantograph 3 can be isolated from the intermediate circuit 28 with energy storage device 13, converter 14 and electric motor 15.

In FIG. 1 the pantograph 3 is brought into its rest position 30, in which it is lowered and the sliding contact 10 is at a distance from the network 8 located externally outside the vehicle. In this position the vehicle 1 can be driven by energy from the energy storage device 13 or from a generator 22, which is powered by an internal combustion engine 23. The generator 22 and the internal combustion engine 23 are part of the intermediate circuit 28. In the rest position the switching means 27 normally isolates the intermediate circuit 28 from the pantograph 3. However in order to ensure that there is no voltage in the external electrically conductive parts of the pantograph 3, such as for example the sliding contact 10, even in the case of a failure of the switching means 27, an electrical connection from the ground/mass 20 to the pantograph 3 is created by means of the connection of the contact surface 12 to the mating contact 17. This connection is closed autonomously without additional impetus upon lowering of the pantograph 3 into its rest position in FIG. 1.

In that the locking fork 18 comprises a tapered seating for the locking tab 11, the locking tab 11 and thus the pantograph strut 9 are centered in the locking fork 18. By means of this centering function of the locking assembly 7, closure of the contact assembly 6 made up of contact surface 12 and mating contact 17 is also guaranteed.

In order to register the attainment of the rest position 30 in FIG. 1 of the pantograph 3, the vehicle 1 comprises a switch 24, which in FIG. 1 is embodied as a proximity switch and which signals attainment of the rest position. In the embodiment in FIG. 1, the switch 24 determines when the locking tab 11 on the pantograph strut 9 reaches a position below a predefined distance from the switch 24. The switch 24 hereby assumes a different switching position, which is registered accordingly by the vehicle controller (not shown) and indicated for example by means of an optical or acoustic signal. Instead of the locking tab 1, the position of another moving part of the pantograph 3 can be interrogated.

Figure 3:
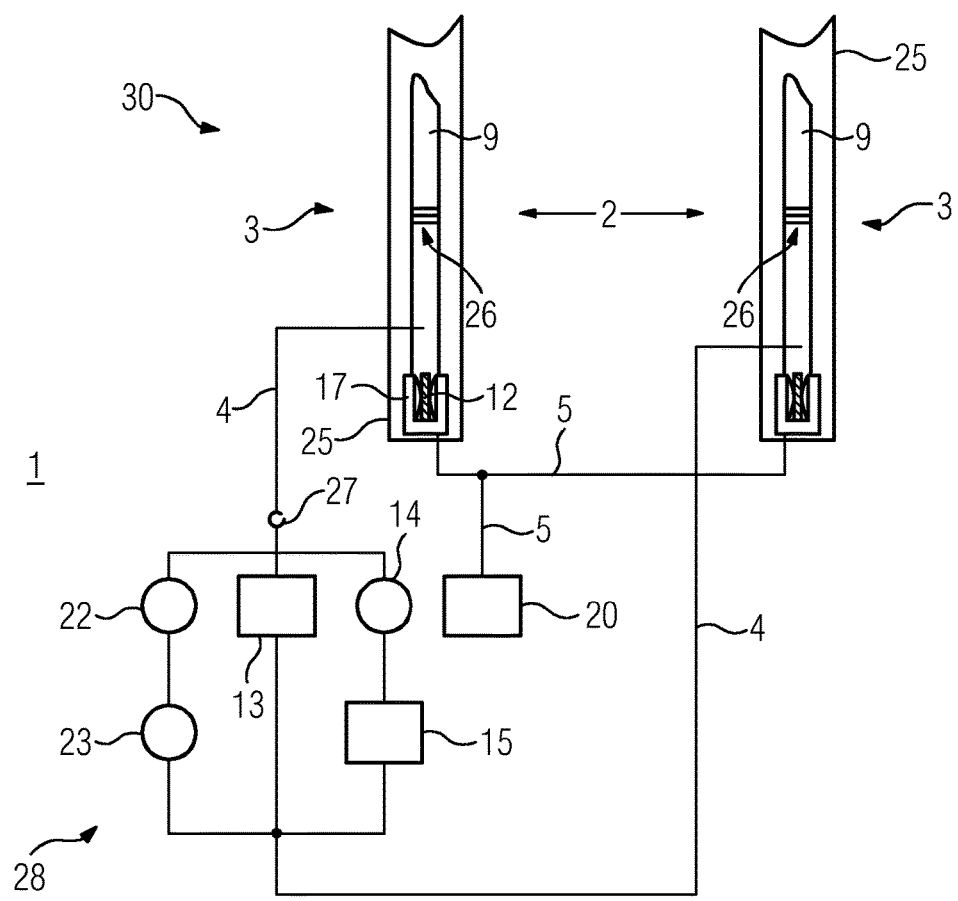
FIG. 3 shows a schematic representation of a second embodiment of an inventive pantograph configuration in the rest position.

There follows a description of the exemplary embodiment of the pantograph configuration 2 in FIG. 3. For the sake of simplicity, only the differences from the embodiment in FIGS. 1 and 2 are addressed.

The pantograph 3 from the embodiment in FIG. 3 is embodied with a pantograph strut 9 extendable in a linear manner, which is guided in a fixed gantry 25 in a linear manner. The pantograph strut 9 can be extended from this fixed gantry 25 and retracted into it again. In FIG. 3 the pantograph configuration 2 is shown in rest position 30. The gantry 25 is for example arranged on a driver's cab of the vehicle 1, which is however not represented in detail here. The contact surface 12 is arranged at the lower end of the pantograph strut 9. As in the embodiment in FIG. 1 the pantograph 3 comprises a sliding contact 10 or a similar contact to network 8 located externally outside the vehicle, which is connected to the contact surface 12 in an electrically conductive manner. At the lower end of the linear guide for the pantograph strut 9 the gantry 25 comprises a mating contact 17 embodied in the form of a fork, which is embodied to be complementary to the contact surface. Consequently in the rest position in FIG. 3 the contact surface 12 is retracted into the mating contact 17 and has created an electrical connection to the mating contact 17.

In the embodiment in FIG. 3, just as in the embodiment in FIG. 1, in the rest position of the pantograph configuration 2 an electrical contact is created between the pantograph 3 and the first network 4 located internally within the vehicle and the second network 5 located internally within the vehicle. Here it is also thereby ensured that in the rest position the pantograph 3 is connected to the mass 20 of the vehicle 1.

The vehicle in FIG. 3 is provided with two pantographs 3. This is intended to represent a two-pole embodiment, as employed in the case of a road vehicle, that is to say a non rail-borne vehicle. In the rest position in FIG. 3 the pantograph 3 and the mating contacts 17 are connected to each other.

The pantograph configuration 2 in FIG. 3 comprises a marker 26 on the pantograph strut 9, which is visible from outside the vehicle 1 and by means of which the attainment of the rest position of the pantograph configuration 2 can be recognized. The secure status of the rest position is thereby attained and non-hazardous working in the vicinity of the pantograph 3 is possible.

The invention claimed is:
1. A pantograph configuration for a vehicle, comprising:
at least one pantograph disposed externally outside the vehicle and configured to at least temporarily contact an electrical network, said at least one pantograph being movably mounted between a contact position and a rest position;
a first electrical network located internally within the vehicle and being connected to said pantograph in the contact position thereof; and a second electrical network located internally within the vehicle and connected to ground potential of the vehicle and to said pantograph in the rest position thereof; and wherein said pantograph, in the rest position thereof, is connected to said first electrical network and said second electrical network.

2. The pantograph configuration according to claim 1, wherein said pantograph comprises at least one contact device and said second network located internally within the vehicle comprises a mating contact device, and wherein said at least one contact device and said mating contact device are connected to one another in the rest position and isolated from one another in the contact position.

3. The pantograph configuration according to claim 2, wherein said at least one contact device is disposed on a section of said pantograph that moves between the rest position and the contact position.

4. The pantograph configuration according to claim 1, which further comprises at least one switching device configured to assume a first switching state in the contact position of said pantograph and a second switching state in the rest position of said pantograph.

5. The pantograph configuration according to claim 1, which further comprises at least one indicator configured to assume a first indication status in the rest position of said pantograph and to assume a second indication status outside the rest position different from the first indication status.

6. The pantograph configuration according to claim 1, wherein said first network located internally within the vehicle is at least temporarily connected at least to an energy source located internally within the vehicle.

7. The pantograph configuration according to claim 1, which comprises at least two pantographs embodied for contact with mutually different electrical networks located externally outside the vehicle, and which are electrically connected to each other in the rest position.

8. A vehicle, comprising a pantograph configuration according to claim 1.

9. The vehicle according to claim 8, configured as a non rail-borne vehicle.

10. The vehicle according to claim 8, configured as a hybrid vehicle with at least two different energy converters.

* * * * *